United States Patent
Pelkey

(10) Patent No.: US 6,822,460 B2
(45) Date of Patent: Nov. 23, 2004

(54) METHOD AND APPARATUS FOR DETECTING A DRY/WET STATE OF A THERMISTOR BEAD USING TEMPERATURE COMPENSATION

(75) Inventor: William H. Pelkey, Charlotte, VT (US)

(73) Assignee: Simmonds Precision Products, Inc., Charlotte, NC (US)

(*) Notice: Subject to any disclaimer, the term of this patent is extended or adjusted under 35 U.S.C. 154(b) by 80 days.

(21) Appl. No.: 10/314,836

(22) Filed: Dec. 9, 2002

(65) Prior Publication Data

US 2004/0108863 A1 Jun. 10, 2004

(51) Int. Cl.[7] .............................................. G01R 27/22
(52) U.S. Cl. ...................................... 324/694; 324/699
(58) Field of Search ................................ 324/694, 693, 324/664, 697, 699, 721; 73/73, 295, 77; 338/22 R

(56) References Cited

U.S. PATENT DOCUMENTS

| | | | | |
|---|---|---|---|---|
| 3,870,972 A | * | 3/1975 | Vanderbilt et al. | 331/140 |
| 4,416,153 A | * | 11/1983 | Williams | 73/295 |
| 4,706,497 A | * | 11/1987 | Regan | 73/295 |
| 5,111,692 A | * | 5/1992 | McQueen et al. | 73/295 |
| 5,719,332 A | * | 2/1998 | Wallrafen | 73/295 |

* cited by examiner

*Primary Examiner*—Anjan K. Deb
(74) *Attorney, Agent, or Firm*—Calfee, Halter & Griswold LLP; David R. Percio, Esq.

(57) ABSTRACT

A system for determining a level of a combustible fuel in an aircraft fuel tank with a thermistor bead comprises: apparatus for disposing the thermistor bead at a height in the fuel tank; a temperature sensor disposed in the fuel tank for measuring a temperature in proximity to the thermistor bead; a first circuit for conducting a constant bias current of less than thirty milliamps into the fuel tank and through the thermistor bead; a second circuit for generating a reference voltage in proportion to the measured temperature of the sensor; a third circuit for measuring a voltage across the thermistor bead in response to the bias current, and also coupled to the second circuit for detecting the dry/wet state of the thermistor bead based on the measured and reference voltages and generating a signal indicative thereof; and a fourth circuit for determining the level of fuel in the tank based on the bead height and dry/wet state signal.

6 Claims, 3 Drawing Sheets

(BACKGROUND)

METHOD AND APPARATUS FOR DETECTING A DRY/WET STATE OF A THERMISTOR BEAD USING TEMPERATURE COMPENSATION

BACKGROUND OF THE INVENTION

The present invention is directed to the detection of dry/wet states of a thermistor bead, in general, and more particularly, to a method and apparatus for detecting a dry/wet state of a thermistor bead utilizing a temperature compensated reference level circuit.

Sensing liquid level in a container, like fuel in an aircraft fuel tank, for example, has been performed using resistive bead type thermistors which have an inverse temperature coefficient. When current is conducted through a thermistor bead in air, i.e. a dry state, the bead increases in temperature and exhibits a low resistance to the current. In contrast, when the thermistor bead is submersed in a liquid, like jet fuel, for example, the bead is cooled and its resistance to current conducted therethrough is increased. Current vs. voltage (I/V) characteristics of a typical thermistor bead at various temperatures is shown in the graph of FIG. 1. It is readily observable from the graph of FIG. 1 that the voltage across the thermistor becomes a viable measurement for detecting a wet vs. dry (wet/dry) state of the thermistor bead as the current conducted therethrough becomes greater than 45 milliamps.

For example, if the bead current is fixed at say 45 ma, and a voltage reference level is set at approximately 3.2 volts, then for all temperatures within the range of −54° C. to +74° C., a bead voltage greater than the reference level indicates a wet state and vice versa. Thus, by passing a constant current equal to or greater than 45 ma through a thermistor bead and lowering the bead from the top of the container, it may be determined at what level in the container the thermistor bead becomes submersed into the liquid by detecting the wet/dry state thereof based on the voltage across the thermistor bead and a fixed reference voltage.

Known interface circuitry which uses the above described method of detecting the dry/wet state of a thermistor bead is shown in the block diagram schematic of FIG. 2. Referring to FIG. 2, a thermistor bead 10 is coupled between a constant current source 12 and a common or ground return. The constant current source 12 is powered by a power supply 14 and is operative to conduct current through the thermistor bead 10. The voltage across the thermistor bead 10 is sensed by one input of a comparator circuit 16 which is also powered by the supply 14 and common return. A fixed reference voltage is generated by a circuit 18 which is powered by the supply 14. The comparator circuit 16 compares the reference voltage which is coupled to another input thereof with the thermistor bead voltage. When the thermistor bead voltage exceeds the reference voltage, a wet bead state is effected at the output of the comparator 16 and when the thermistor bead voltage is less than the reference voltage, a dry bead state is effected at the output of the comparator 16.

As noted above, to insure proper performance of the thermistor bead and detection circuitry using the above described method, the bead 10 should be biased with a constant current equal to or greater than 45 milliamps where voltage levels across the bead are dry/wet distinct for all practical temperature environments (see the graphs of FIG. 1, for example). For level sensing of combustible liquids in a container with a thermistor bead, the bias current level of 45 milliamps may not be considered safe, and thus unacceptable. For example, the FAA has deemed this bias current level unacceptable in terms of the maximum allowable current that may enter an aircraft fuel tank. Only currents less than 30 milliamps with justification have been deemed acceptable for aircraft fuel tanks.

However, as the bead bias current is lowered to less than 30 ma, it is no longer possible to distinguish a wet bead state from a dry bead state based on the comparison of the bead voltage to a fixed reference voltage across a wide operating temperature range, like −54° C. to 74° C., for example, especially between a dry state at −54° C. and a wet state at 74° C. Accordingly, at bead currents less than 30 ma, the thermistor bead may not be an acceptable level measurement sensor for combustible liquids across a wide operating temperature range using interface circuitry implementing the above described traditional method.

SUMMARY OF THE INVENTION

In accordance with one aspect of the present invention, a method of detecting a dry/wet state of a thermistor bead comprises the steps of: conducting a bias current through the thermistor bead; measuring a voltage across the thermistor bead in response to the bias current; measuring a temperature in proximity to the thermistor bead; generating a reference voltage in proportion to the measured temperature; and detecting the dry/wet state of the thermistor bead based on the measured and reference voltages.

In accordance with another aspect of the present invention, apparatus for detecting a dry/wet state of a thermistor bead comprises: a first circuit coupled to the thermistor bead for conducting a bias current through the thermistor bead; a temperature sensor for measuring a temperature in proximity to the thermistor bead; a second circuit coupled to the temperature sensor for generating a reference voltage in proportion to the measured temperature of the sensor; and a third circuit coupled to the thermistor bead for measuring a voltage across the thermistor bead in response to the bias current, and also coupled to the second circuit for detecting the dry/wet state of the thermistor bead based on the measured and reference voltages.

In accordance with yet another aspect of the present invention, a system for determining a level of liquid in a container with a thermistor bead comprises: means for disposing the thermistor bead at a height in the container; a temperature sensor disposed in the container for measuring a temperature in proximity to the thermistor bead; a first circuit coupled to the thermistor bead for conducting a bias current through the thermistor bead; a second circuit coupled to the temperature sensor for generating a reference voltage in proportion to the measured temperature of the sensor; a third circuit coupled to the thermistor bead for measuring a voltage across the thermistor bead in response to the bias current, and also coupled to the second circuit for detecting the dry/wet state of the thermistor bead based on the measured and reference voltages and generating a signal indicative thereof; and a fourth circuit for determining the level of liquid in the container based on the bead height and dry/wet state signal.

DETAILED DESCRIPTION OF THE INVENTION

Figure 2:
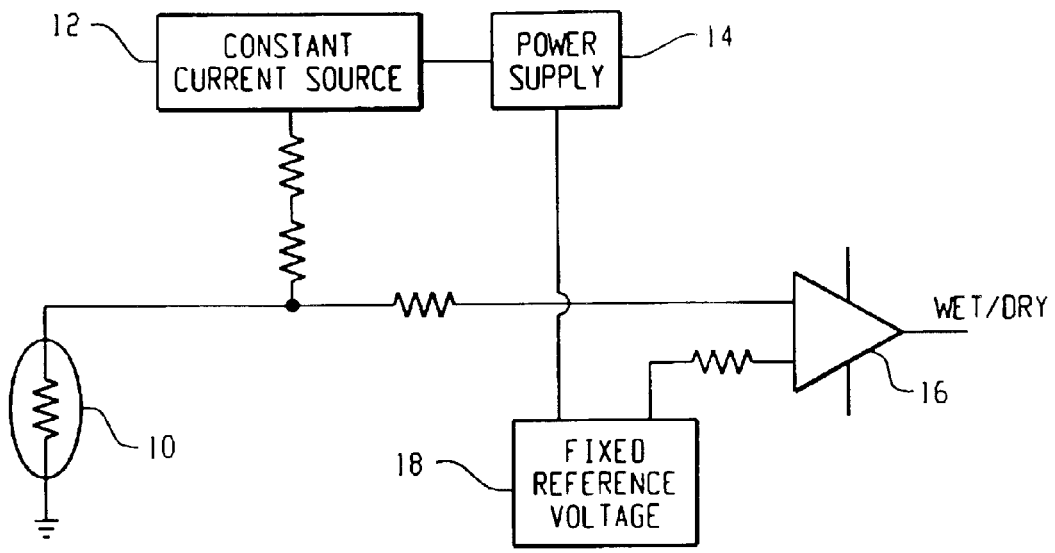
FIG. 2 is a block diagram circuit schematic of interface circuitry for detecting the dry/wet state of a thermistor bead based on a known method.
Figure 3:
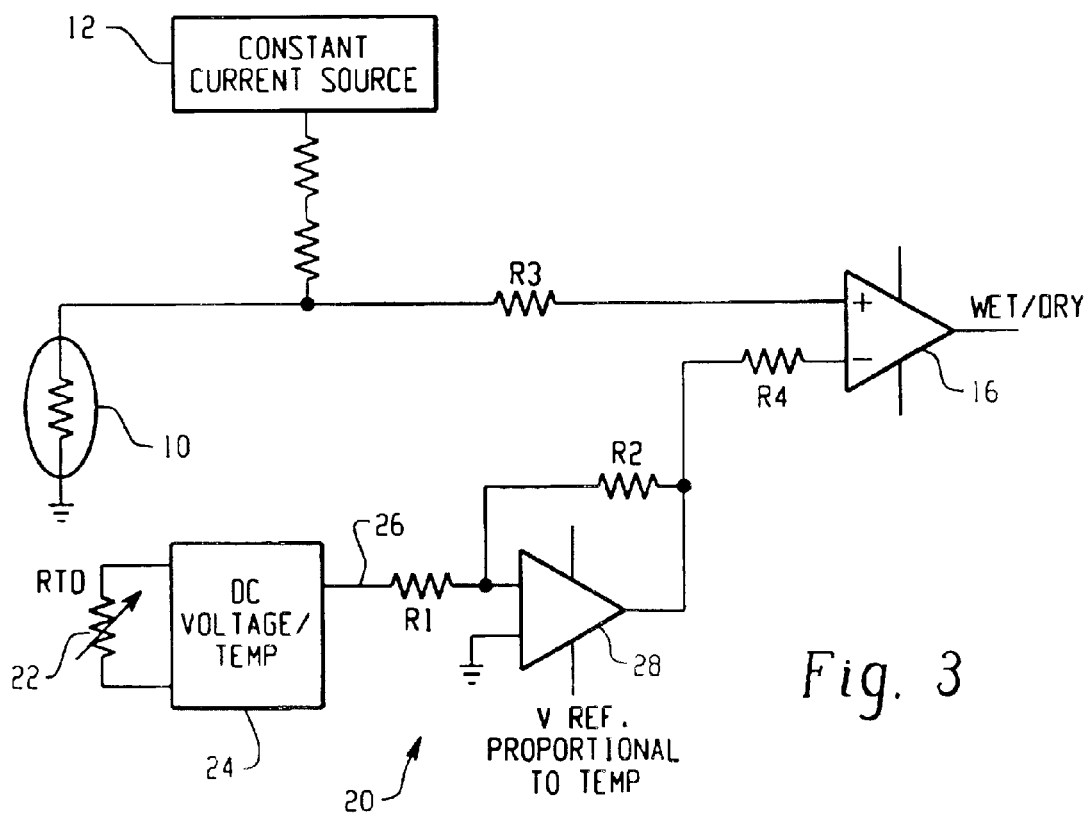
FIG. 3 is a block diagram circuit schematic of apparatus for detecting the dry/wet state of a thermistor bead suitable for embodying the broad principles of the present invention.

FIG. 3 is a block diagram schematic of apparatus for detecting the dry/wet state of the thermistor bead 10 suitable for embodying the principles of the present invention. In the embodiment of FIG. 3, the fixed reference voltage generator 18 of the embodiment of FIG. 2 is replaced with a temperature compensated reference voltage generator 20 which generates a reference voltage in proportion to a measured temperature which will become more evident from the following description. Referring to FIG. 3, a temperature sensor 22, which may be a resistance temperature detector (RTD), for example, is disposed in proximity to the thermistor bead 10 for measuring a temperature. The RTD 22 is coupled to a circuit which converts the temperature measurement to a voltage in proportion thereto, which voltage being generated over signal line 26. Thus, circuit 24 varies the reference voltage substantially as an inverse linear function of the measured temperature.

Figure 4:
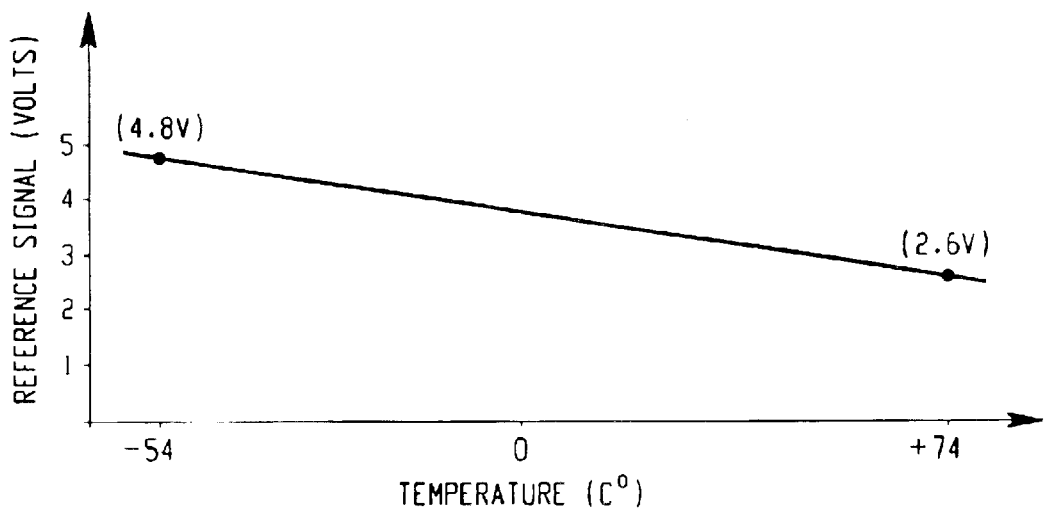
FIG. 4 is a graph exemplifying a reference voltage to temperature characteristics curve suitable for use in the embodiment of FIG. 3.

The graph of FIG. 4 exemplifies typical reference voltage to temperature curve characteristics. In the present example, at −54° C., the reference voltage is approximately 4.8 volts, at +74° C., the reference voltage is approximately 2.6 volts. Thus, according to the exemplary curve of FIG. 4, the reference voltage is inversely linear to the temperature, having a slope of approximately −0.017 and an offset of 3.88, for example.

Figure 1:
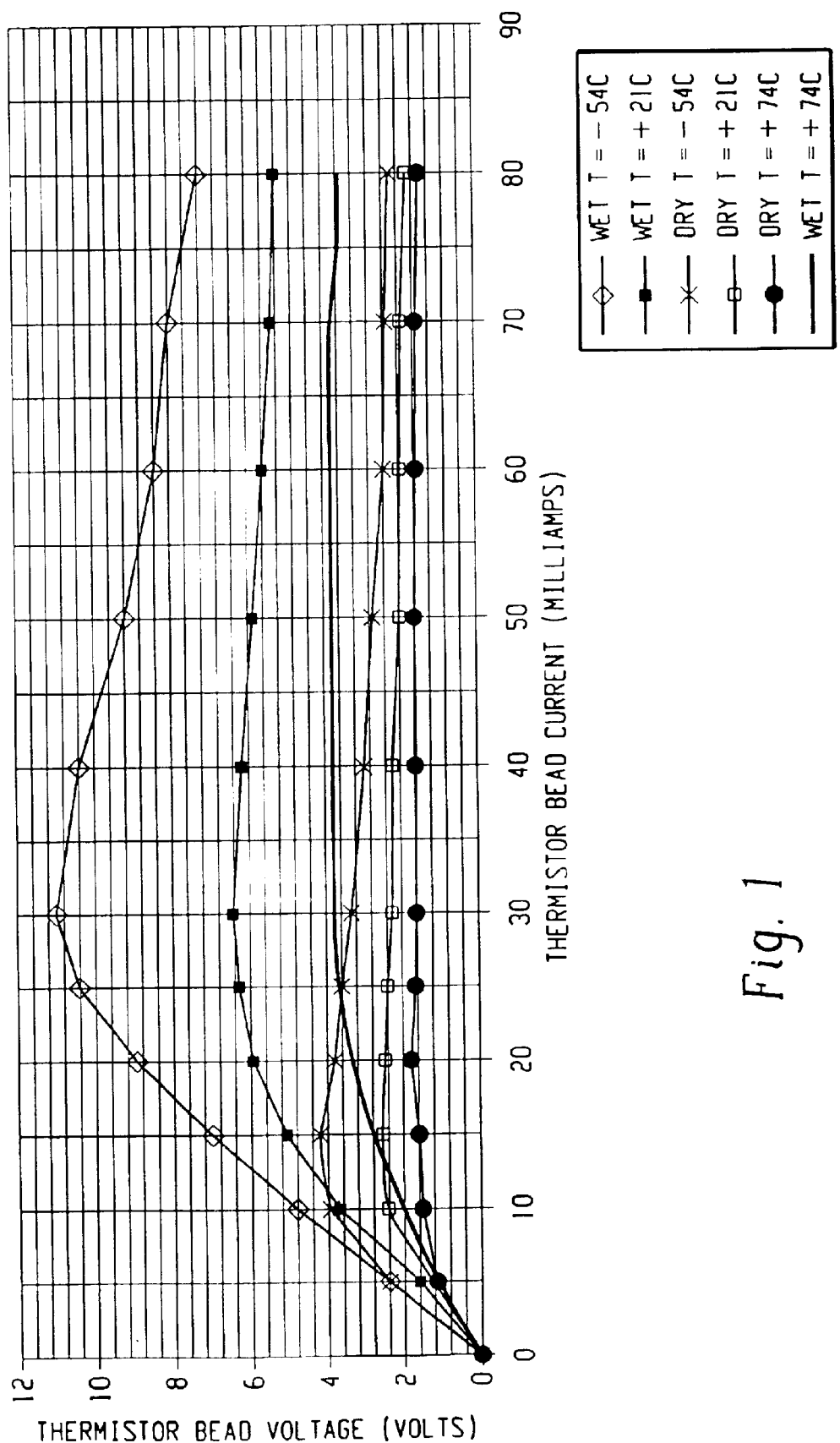
FIG. 1 is a graph depicting dry and wet current vs. voltage characteristics of a typical thermistor bead at various temperatures.
Figure 5:
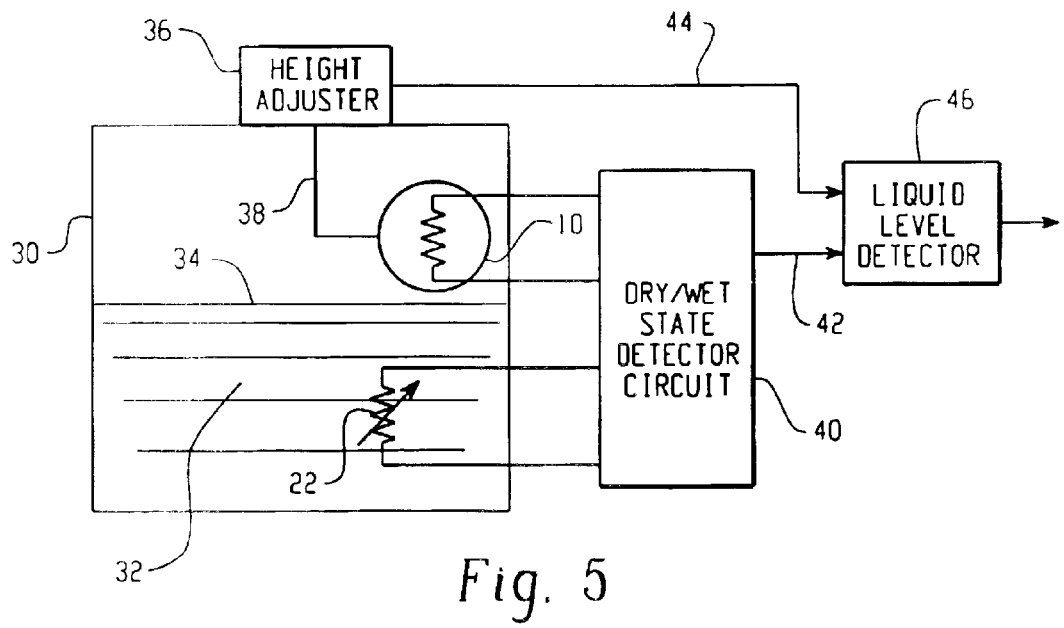
FIG. 5 is an illustration of a system for determining a level of liquid in a container suitable for embodying another aspect of the present invention.

Since the reference voltage over signal line 26 is dependent on the bias current conducted through the thermistor bead 10 by the constant current source 12 (see graph of FIG. 1), a voltage gain amplifier 28 is disposed in series with signal line 26 for adjusting the reference voltage to temperature curve of FIG. 5 based on the bias current of the bead 10. In the present embodiment, the closed loop gain of amplifier 28 is determined by the ratio of the feedback resistor R2 to the input resistor R1. One or the other of the resistors R1 and R2 may be adjustable for voltage gain adjustment of amplifier 28 based on the eventual bias current of the bead 10.

Accordingly, the comparator 16 of the present embodiment has one input coupled to the thermistor bead 10 through a resistor R3 for measuring the voltage across the bead 10 in response to the bias current conducted therethrough, and another input coupled to the output of the amplifier 28 through a resistor R4. Thus, the comparator circuit 16 is operative to compare the measured bead voltage to the temperature compensated reference voltage to detect the dry/wet state of the bead 10. For example, when the measured bead voltage exceeds the reference voltage, the comparator generates a signal in a state indicative of a wet bead and vice versa independent of the temperature of the surrounding environment.

It is understood that the characteristics of the reference voltage to temperature curve produced by the conversion circuit 24 may be achieved by many different techniques, including empirically derived temperature vs. reference voltage points for producing the curve. Also, it is understood that the bead bias current may be different from one application to another. Accordingly, once knowing the bead bias current, a reference voltage may be varied in accordance with measured temperature utilizing the conversion circuit 24 and/or the voltage gain amplifier 28 to distinguish the dry/wet state across a wide temperature range, like on the order of −54° C. to +74° C., for example. In the present embodiment, the reference voltage may vary from 5 to 2.8 volts over the temperature range of −54° C. to +74° C., for example, for bias currents less than 30 ma.

FIG. 5 is an illustration of a system for determining a level of liquid in a container with the thermistor bead 10 suitable for embodying another aspect of the present invention. Referring to FIG. 5, a container 30 contains a liquid 32 at a level 34. The liquid 32 may be of the type which is combustible, like aircraft fuel, for example, in which case the container 30 is an aircraft fuel tank. In the present system, the thermistor bead 10 and RTD 22 are disposed in the tank 30. The temperature sensor 22 may be located in the tank for measuring temperature at or in proximity to the thermistor bead 10. While the RTD 22 is shown in the liquid 32, it is understood that this location is merely exemplary of the sensor location and should not be taken as limiting in any way.

The thermistor bead 10 may be fixedly located at a known height or level within the container 30 or coupled to apparatus 36 which is operative to adjust the height of the bead 10 within the container 30 via a convenient linkage 38, for example. Both of the thermistor bead 10 and temperature sensor 22 are coupled to a dry/wet detection circuit 40 which may be disposed outside of the container. For the present embodiment, the circuit 40 may be the same or similar to the embodiment described in connection with FIG. 3 and generates a signal 42 indicative of the dry/wet state of the bead 10 over a wide operating temperature range. It is understood that if the container 30 is an aircraft fuel tank, then the bead bias current is generated at less than 30 ma. in accordance with the FAA regulations. In addition, the apparatus 36 generates a signal 44 which is representative of the adjusted height of the thermistor bead 10 within the tank 30. Signals 42 and 44 are coupled to a liquid level detector 46 which determines the level of liquid in the tank 30 based on the height and dry/wet state of the bead 10.

In operation, the apparatus 36 may adjust the height of the bead 10 and provide the signal 44 representative thereof to the detector 46. Alternatively, the bead 10 may be disposed at a known height within the container 30 and the known height or level of the bead 10 may be provided as signal 44 to the detector 46. Concurrently, the detector 40 detects the dry/wet state of the bead 10 utilizing a temperature compensated reference voltage signal as described in connection with the embodiment of FIG. 3 and generates a signal 42 indicative thereof. Accordingly, the liquid level detector 46 may determine the level of liquid 34 within the tank based on the signal 42 and signal 44 or height of the bead 10.

While the present invention has been described herein above in connection with one or more embodiments, it is understood that such description is merely by way of example. Therefore, the present invention should be limited in any way, shape or form by the such embodiments, but rather construed in breadth and broad scope in accordance with the claims appended hereto.

What is claimed is:

1. A system for determining a level of a combustible fuel in an aircraft fuel tank with a thermistor bead comprising:

an aircraft fuel tank containing said combustible fuel;

means for disposing said thermistor bead at a height in said fuel tank;

a temperature sensor disposed in said fuel tank for measuring a temperature in proximity to said thermistor bead;

a first circuit disposed outside of said fuel tank and coupled to the thermistor bead for conducting a constant bias current into said fuel tank and through said thermistor bead, said first circuit operative to limit the constant bias current to less than thirty milliamps;

a second circuit coupled to the temperature sensor for generating a reference voltage in proportion to the measured temperature of said sensor;

a third circuit disposed outside of said fuel tank and coupled to the thermistor bead for measuring a voltage across said thermistor bead in response to said bias current, and also coupled to said second circuit for detecting said dry/wet state of said thermistor bead based on said measured and reference voltages and generating a signal indicative thereof; and a fourth circuit for determining the level of fuel in the fuel tank based on the bead height and dry/wet state signal.

2. The system of claim 1 wherein the second circuit includes a circuit for varying the reference voltage in proportion to the measured temperature.

3. The system of claim 2 wherein the reference voltage is varied substantially as an inverse linear function of the measured temperature.

4. The system of claim 1 wherein the second circuit includes a circuit for converting the measured temperature to a voltage representative thereof; and a circuit for varying the reference voltage in proportion to the temperature representative voltage.

5. The system of claim 1 wherein the third circuit comprises a comparator for detecting the dry/wet state of the thermistor bead based on a comparison of the measured voltage to the reference voltage.

6. The system of claim 1 wherein the temperature sensor comprises a resistance temperature detector.

* * * * *